US012662081B2

(12) United States Patent
George et al.

(10) Patent No.: US 12,662,081 B2
(45) Date of Patent: Jun. 23, 2026

(54) SEATBELT ASSISTANCE

(71) Applicant: Aptiv Technologies AG, Schaffhausen (CH)

(72) Inventors: Amil George, Wuppertal (DE); Timo Rehfeld, Cologne (DE); Alexander Barth, Wermelskirchen (DE)

(73) Assignee: Aptiv Technologies AG, Schaffhausen (CH)

( * ) Notice: Subject to any disclaimer, the term of this patent is extended or adjusted under 35 U.S.C. 154(b) by 79 days.

(21) Appl. No.: 18/442,789

(22) Filed: Feb. 15, 2024

(65) Prior Publication Data

US 2024/0278747 A1 Aug. 22, 2024

(30) Foreign Application Priority Data

Feb. 17, 2023 (EP) .................................... 23157330

(51) Int. Cl.
*B60R 22/48* (2006.01)
*B60R 22/34* (2006.01)

(52) U.S. Cl.
CPC .............. *B60R 22/48* (2013.01); *B60R 22/34* (2013.01); *B60R 2022/4808* (2013.01); *B60R 2022/4866* (2013.01)

(58) Field of Classification Search
CPC ......... B60R 22/00; B60R 22/02; B60R 22/48; B60R 22/34; B60R 21/00; B60R 21/02; B60N 2/00; B60W 40/08; B60W 40/09; G06K 9/00; G06K 9/60; G06K 9/66
See application file for complete search history.

(56) References Cited

U.S. PATENT DOCUMENTS 10,953,850 B1 3/2021 Pertsel
2007/0195990 A1 8/2007 Levy
2019/0147262 A1* 5/2019 Kuehnle .......... G06Q 10/06398 340/439
2020/0231109 A1 7/2020 Baltaxe
2020/0331429 A1* 10/2020 Thomas .................. B60R 22/34
2021/0206344 A1 7/2021 George
2023/0026640 A1 1/2023 Thomas

OTHER PUBLICATIONS

Extended European Search Report for EP23157330.4, 9 pages Jul. 18, 2023.
Kashevnik et al., "Seat Belt Fastness Detection Based on Image Analysis from Vehicle In-abin Camera," 2020 26th Conference of Open Innovations Association (FRUCT), 2020, pp. 143-150, doi: 10.23919/FRUCT48808.2020.9087474.
(Continued)

*Primary Examiner* — Van T Trieu
(74) *Attorney, Agent, or Firm* — Miller Johnson

(57) ABSTRACT

A computer-implemented method for seatbelt assistance in a vehicle includes determining, based on interior cabin data, whether a seatbelt is correctly fastened. The determining does not provide a positive confirmation that the seatbelt is correctly fastened. The method includes outputting a prompt to a person on the seatbelt to take an action to enable re-determining whether the seatbelt is correctly fastened. The method includes re-determining, based on updated interior cabin data indicating a reaction of the person to the prompt, whether the seatbelt is correctly fastened.

12 Claims, 14 Drawing Sheets

(56) References Cited

OTHER PUBLICATIONS

Elihos et al., "Comparison of Image Classification and Object Detection for Passenger Seat Belt Violation Detection Using NIR & RGB Surveillance Camera Images," 2018 15th IEEE International Conference on Advanced Video and Signal Based Surveillance (AVSS), 2018, pp. 1-6, doi: 10.1109/AVSS.2018.8639447.
Yi et al., "Safety Belt Wearing Detection Algorithm Based on Human Joint Points." 2021 IEEE International Conference on Consumer Electronics and Computer Engineering (ICCECE), 2021, pp. 538-541, doi: 10.1109/ICCECE51280.2021.9342340.
Balci et al., "NIR Camera Based Mobile Seat Belt Enforcement System Using Deep Learning Techniques," 2018 14th International Conference on Signal-Image Technology & Internet-Based Systems (SITIS), 2018, pp. 247-252, doi: 10.1109/SITIS.2018.00045.
Zhou et al., "Learning-based seat belt detection in image using salient gradient," 2017 12th IEEE Conference on Industrial Electronics and Applications (ICIEA), 2017, pp. 547-550, doi: 10.1109/ICIEA.2017.8282904.

* cited by examiner

70

2022 December 11; 06:53:50; Seatbelt 61 correctly fastened;
2022 December 11; 17:15:12; Seatbelt 61 correclty fastened;

2022 December 12; 06:50:54; Seatbelt 61 correctly fastened;
2022 December 12; 17:32:45; Seatbelt 61 correclty fastened;
2022 December 12; 18:00:01; Seatbelt 62 incorrectly fastened;
2022 December 12; 18:02:23; Seatbelt 62 incorrectly fastened;
2022 December 12; 18:05:16; Seatbelt 62 correctly fastened;

FIG. 11

SEATBELT ASSISTANCE

CROSS-REFERENCE TO RELATED APPLICATIONS

This application claims priority to EP 23 157 330 filed Feb. 17, 2023, the entire disclosure of which is incorporated by reference.

FIELD

The present disclosure generally relates to safety improvements for vehicles and, in particular, to methods and systems for seatbelt assistance to ensure a correct seatbelt usage in a vehicle.

BACKGROUND

Smart vehicles, such as smart cars, smart busses, and the like, are on their way to significantly improve the safety of passengers. Such smart vehicles may be equipped with on-board cameras and may be capable of capturing images of the vehicle's interior. Those images can then be used, sometimes in combination with other sensors, for different safety related tasks, such as seatbelt assistance, as well as detecting persons in the vehicle, categorizing persons in adults or children, detecting objects in the vehicle, determining whether one of the vehicle's door is open, or the like.

The most common safety measure in a vehicle is using a seatbelt. This has been proven to reduce the risk of bad or even lethal injuries in crashes. However, wearing a seatbelt in a wrong manner may reduce this positive effect or even worsen the situation, e.g., if, e. g. during an accident, the seatbelt strangulates a person sitting in the vehicle.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Hence, there is a need for a seatbelt assistance system.

In this context, methods, systems and computer program products are presented as defined by the independent claims.

In this respect, according to a first aspect, a computer-implemented method for seatbelt assistance is provided. The method comprises determining, based on interior cabin data, whether a seatbelt is correctly fastened, wherein the determining does not provide a positive confirmation that the seatbelt is correctly fastened. A prompt is outputted to a person on the seatbelt to take an action to enable re-determining whether the seatbelt is correctly fastened. Based on updated interior cabin data indicating a reaction of the person to the prompt, the method re-determines whether the seatbelt is correctly fastened.

In another aspect, a system for vehicle exit assistance is provided, comprising a seatbelt sensing system, a data processing system, interfaces for outputting a prompt, configured to perform the computer-implemented methods as described herein.

In another aspect, a vehicle is provided comprising a system for vehicle exit assistance as described herein.

Finally, a computer program is presented that comprises instructions which, when the program is executed by a computer, cause the computer to carry out the methods described herein.

Further refinements are set forth by the dependent claims.

These and other objects, embodiments and advantages will become readily apparent to those skilled in the art from the following detailed description of the embodiments having reference to the attached figures, the invention not being limited to any particular embodiments.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Aspects and examples of the present disclosure are described with reference to the following figures, in which:

FIG. 11 schematically the logging of the results of the determination that a seatbelt is correctly or not correctly fastened.

In the drawings, reference numbers may be reused to identify similar and/or identical elements.

DETAILED DESCRIPTION

The present disclosure relates to safety improvements for vehicles and, in particular, to methods and systems for seatbelt assistance to ensure a correct seatbelt usage in a vehicle.

Figure 1:
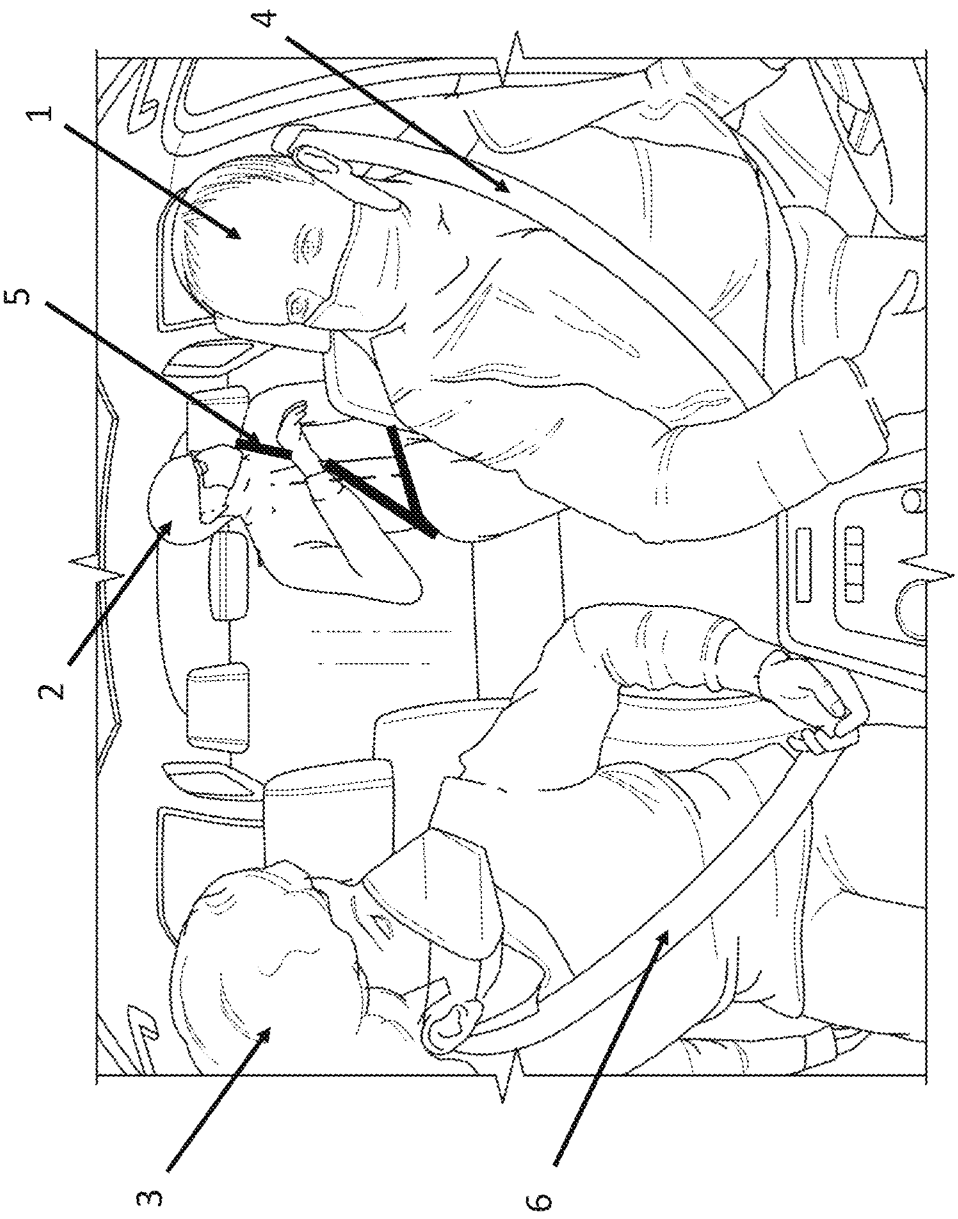
FIG. 1 shows the interior of a vehicle cabin with persons.

FIG. 1 depicts the interior of a cabin of a vehicle as it is seen in a sensor field-of-view, such as the field-of-view of a camera installed in the cabin. Three persons 1, 2 and 3 are seated in the vehicle. Person 1 is seated in the driver seat of the vehicle, while person 2 is seated on the back seat and person 3 on the passenger seat next to the driver seat. Person 1 is wearing seatbelt 4, and persons 2 and 3 are wearing seatbelts 5 and 6 respectively. The lower arm of person 1 covers the seatbelt fastener of seatbelt 4. Person 3 has moved his hand to the seatbelt fastener of seatbelt 6, while wearing the lap belt of seatbelt 5 not in a correct position. Rather, person 3 seems to sit on the lap belt of his seatbelt 6. Person 2 sitting on the back seat is occluding with his hand parts of the shoulder belt of seatbelt 5.

Figure 2:
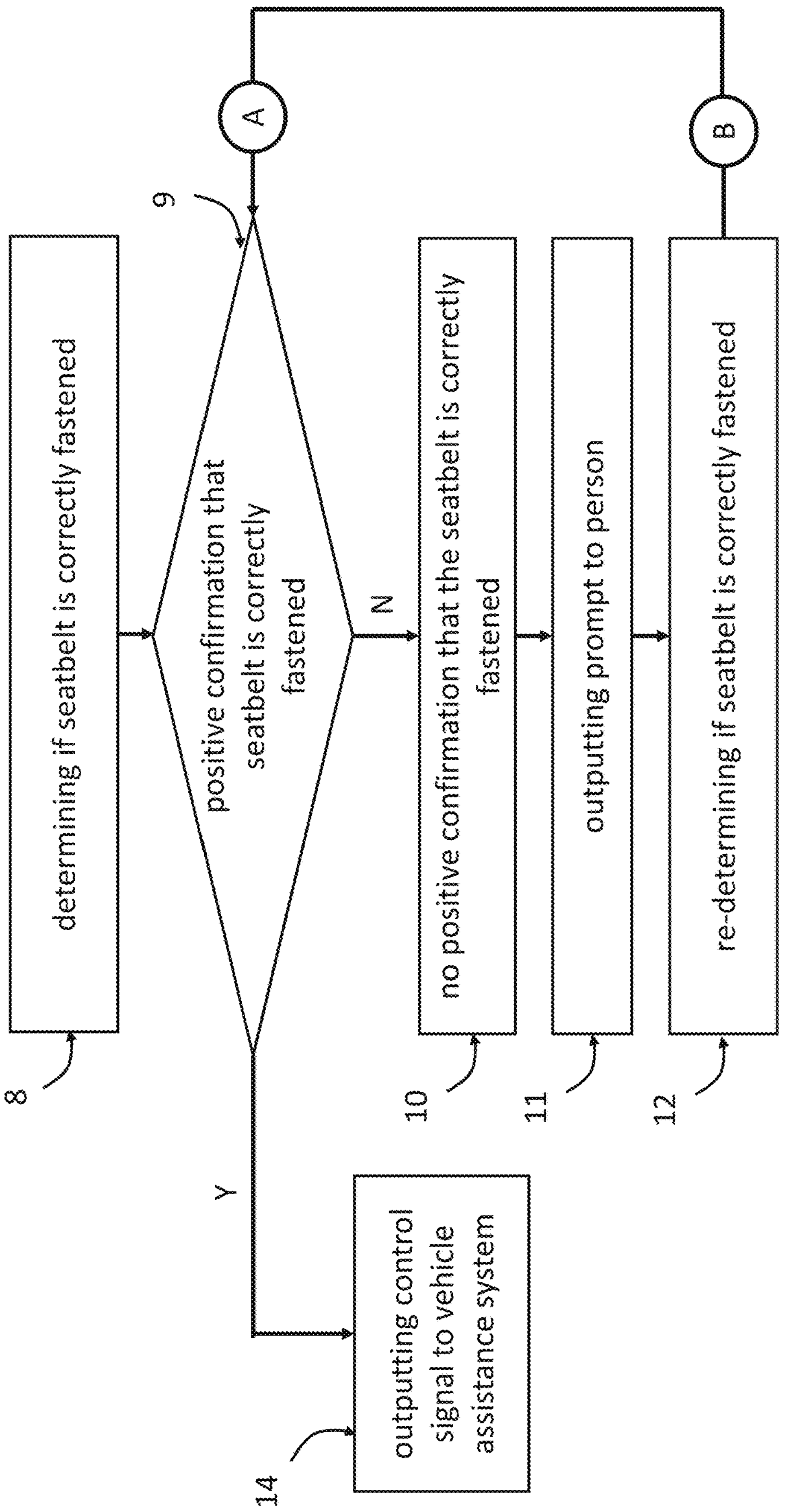
FIG. 2 depicts a computer-implemented sequence for seatbelt assistance as disclosed herein.

FIG. 2 is a basic flow chart of the method for seatbelt assistance in a vehicle as disclosed herein. The method determines 8, based on interior cabin data, whether a seatbelt is correctly fastened. When determining 8 provides a positive confirmation that the seatbelt is correctly fastened, the method further comprises outputting, in activity 14, a control signal to a vehicle assistance system. The control signal may comprise an unlock signal, enabling the person/driver to activate the vehicle, such as starting its engine. This ensures that, in this mode, the vehicle can only be driven when the seatbelts of all persons are correctly fastened and therefore can provide the appropriate personal protection in the case of a traffic accident. When the determining 8 does not provide a positive confirmation 9 that the seatbelt is correctly fastened, the method outputs 11, through a vehicle signal outputting system, such as a visual or audio outputting system, a prompt to the person to take an action to enable re-determining whether the seatbelt is correctly fastened. One or more of various causes may be responsible that the aforementioned determining did not yet confirm that the seatbelt is correctly fastened. For example, it may have been determined that the seatbelt is at least partly occluded by a body part or item of the person so that analysis of the interior cabin data does not yield a positive assessment of correct seatbelt fastening, at least not with sufficiently high confidence.

The term correctly fastened as used herein refers to seatbelt fastening meeting at least a certain prescribed level of safety standard. For example, a Y-shaped three-point seatbelt is to be fully buckled in and the belt is to be routed over shoulder, chest and pelvis in a sufficiently tight manner. Computerized analysis of the interior cabin data may confirm that the actual seat belt routing is in line with the prescribed way of seat belt routing according to the safety standards.

A lack of a positive confirmation of seatbelt fastening encompasses a negative confirmation of seatbelt fastening or, in other words, a determination that the seatbelt is fastening incorrectly. This is, for example, the case if analysis of the interior cabin data determines that the belt is routed under the arm as opposed to over the shoulder. A lack of a positive confirmation of seatbelt fastening also encompasses an undecided state, i.e. it can neither be determined with sufficient confidence that the seatbelt is correctly fastened nor that the seatbelt is incorrectly fastened. This is typically the case if a part of the seatbelt region is occluded.

As described in more detail below, the prompt may depend on a cause that the aforementioned determining did not yet confirm that the seatbelt is correctly fastened. For example, it may have been determined, as aforementioned, that the seatbelt is at least partly occluded by a body part or item of the person. In this event, the prompt may request the person to clear a sensor field of view on the seatbelt, i.e. to remove the occlusion. As described in more detail below, the sensor field-of-view may be the field-of-view of one or more visual light or infrared light cameras mounted in the cabin of the vehicle.

Figure 3:
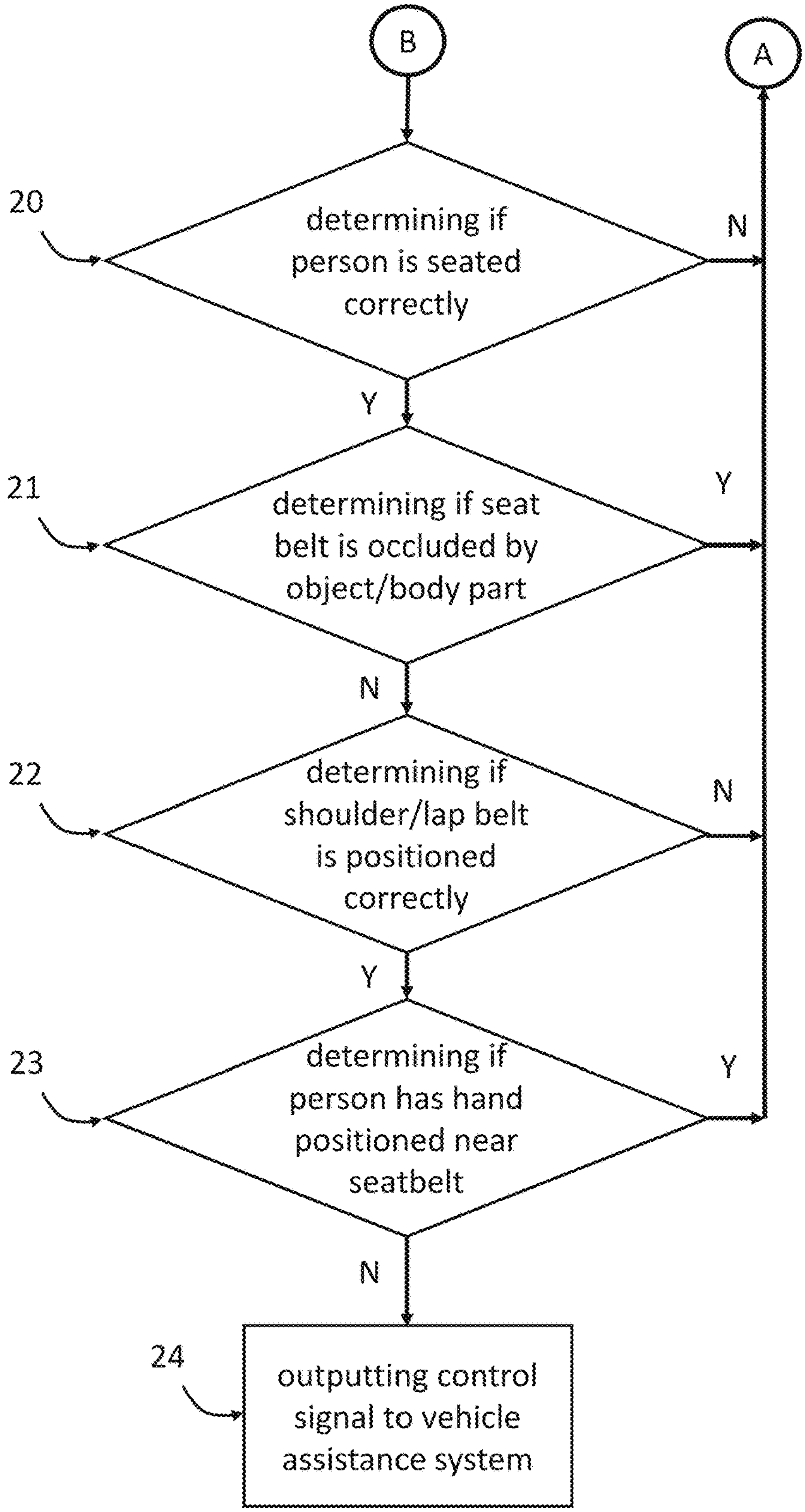
FIG. 3 shows a computer-implemented sequence for determining whether a seatbelt is correctly fastened.
Figure 4:
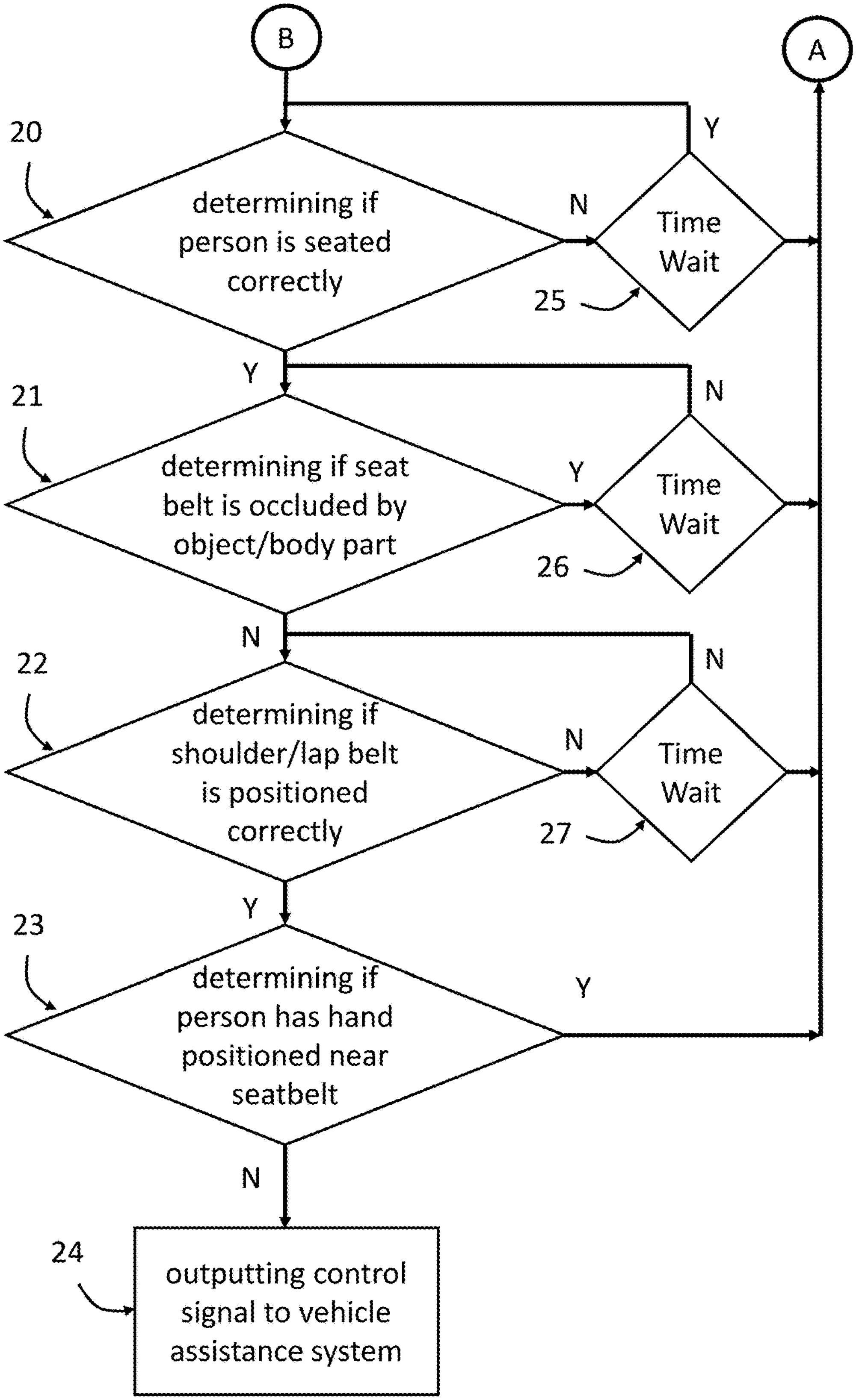
FIG. 4 shows a second computer-implemented sequence for determining whether a seatbelt is correctly fastened.

The method re-determines 12, based on interior cabin data indicating a reaction of the person to the prompt, whether the seatbelt is correctly fastened. If the re-determination 12 yields that the seatbelt is not correctly fastened, the method continues as shown in FIGS. 3 and 4 (indicated by the encircled letter B, serving, together with encircled letter A of FIG. 2, as connecting point to the sequences of FIGS. 3 and 4). The method therefore provides the person with an indication whether the seatbelt is worn correctly and therefore used in the right manner. As a consequence, the person may correct the usage of the seatbelt, as described below in detail. The safety of the person in the vehicle, such as the persons 1, 2, and 3 shown in FIG. 1 is therefore improved.

The determination whether a seatbelt is correctly fastened may be an automated determination executed by a seatbelt assistance system installed in the vehicle without any human interaction. If this automated stage is unsuccessful, the present mechanisms provide for a second stage including interactions with the person, in particular in form of activity 11 which provides a prompt for human reaction from the person in order for then again re-determine 12 whether the seatbelt is correctly fastened. For example, the human reaction may be given by un-occluding the seatbelt region in order to allow for a re-determination 12.

Interior cabin data facilitating the seatbelt re-determination 12 may comprise image data taken from the camera/sensor system installed in the cabin of the vehicle. A more detailed description of the camera/sensor system is given below. In some embodiments, other and further sensors than cameras for the provision of interior cabin data may be used, such as sensors detecting whether the seatbelt fastener has properly fastened the corresponding seatbelt. In addition, haptic-based data may be comprised by the interior cabin data, such as data relating to any touching of the seatbelt fastener by the person. The interior cabin data may then be a combination of more than one sensor system, such as the combination of a camera and a sensor for a seatbelt fastener.

Re-determining 12 may be implemented in the same way as the initial determining 8. The term re-determining indicates that determining 12 is a further determination whether the seatbelt is fastened correctly after the person has been prompted to attend to the cause why the initial determining was not completed successfully. As also discussed below, re-determination 12 (as well as prompting 11 the person) may be further repeated in additional iterations if the person has not reacted adequately to the prompt and the cause of unsuccessful determination still persists (or re-determination 12 identifies another cause for a lack of positive confirmation of correct seatbelt fastening).

In some embodiments, determining 8 or re-determining 12 whether the seatbelt is correctly fastened comprises, based on the interior cabin data, determining that the person is seated incorrectly and the prompt comprises prompting the person to sit correctly. As shown in FIG. 3, activity 20 determines whether the person is seated correctly. If correct seatbelt fastening is positively confirmed, the method may execute activities 21, 22, 23 as described in the following paragraphs of this disclosure. If seatbelt fastening is not positively confirmed or even negatively confirmed, the method proceeds to activity 9 of FIG. 2, indicated by the encircled letter A in FIG. 3 and the corresponding prompt is outputted 11. Referring to the example as illustrated in FIG. 1, it can be confirmed that all three persons 1, 2, and 3 are seated correctly on their respective seats of the vehicle cabin. The encircled letter B denotes the connecting point to the sequence shown in FIGS. 2 and 5.

In some embodiments as, determining 8 or re-determining 12 whether the seatbelt is correctly fastened comprises determining that the seatbelt is occluded by an object and/or a body part of the person and the prompt comprises prompting the person to clear a sensor field of view on the seatbelt. As shown in FIG. 3, activity 21 determines whether the seatbelt is occluded by an object and/or a body part of the person. In the seatbelt is occluded, the method proceeds to activity 9 of FIG. 2, indicated by the encircled letter A in FIG. 3 and the corresponding prompt is outputted 11. Referring again to the example as depicted in FIG. 1, the activity 21 yields that person 1 seated in the driver seat does occlude with his right lower arm and hand the fastener of seatbelt 4. Person 2 seated on the back seat does occlude with his right hand the shoulder belt of seatbelt 5. Person 3 seated on the passenger seat does occlude with his left hand the seatbelt fastener of seatbelt 6. The determining activities 20 and 21 enable the establishment of an un-occluded sensor field-of-view on the seatbelt for a successful subsequent determination 12 whether the seatbelt is correctly fastened.

In some embodiments, determining 8 or re-determining 12 whether the seatbelt 4, 5, and 6 is correctly fastened comprises determining 22 that one or more portions of the seatbelt, such as a shoulder belt and/or a lap belt of the seatbelt 4, 5, or 6 are positioned incorrectly and the prompt comprises prompting the person to correct the seatbelt positioning. As shown in FIG. 3, activity 22 determines whether the shoulder belt and/or a lap belt of the seatbelt are positioned correctly. In a negative confirmation, the method proceeds to activity 9 of FIG. 2, indicated by the encircled letter A in FIG. 3 and the corresponding prompt is outputted 11. As mentioned already above and referring to the example shown in FIG. 1, the seatbelt 6 of person 3 is not positioned correctly as the lap belt is not positioned correctly, since person 3 seems to sit on the lap belt of his seatbelt 6. As a seatbelt correctly positioned on a person sitting on a vehicle seat provides optimal safety, a corresponding determination whether all parts of a seatbelt, such as the shoulder belt and the lap belt, are positioned correctly on a person is provided. This further ensures that persons 1, 2 and 3 will correctly position their seatbelts before the vehicle may be started.

In some embodiments as depicted in FIG. 4, the method further comprises determining 26, before outputting the prompt and based on the interior cabin data, whether the persons 1, 2 and 3 have, within a defined threshold of time, cleared the sensor field of view on the seatbelt. The defined threshold of time may be 3 seconds or 5 seconds or any other defined time-period. Referring again to FIG. 1, the method waits e. g. 3 seconds whether person 1 has removed his right lower arm and hand which currently occlude the fastener of seatbelt 4 in the filed-of-view of the camera installed in the cabin. If, after passing of the three seconds, person 1 has not yet cleared the sight camera on the fastener of seatbelt 4, the method returns to activity 9 of FIG. 2, as illustrated by the encircled letter A in FIG. 4, and in response to the lack of confirmation 10 a correct fastening of seatbelt 4, outputs in activity 11 a prompt to person 1 to clear the camera field of view on seatbelt 4 and its fastener. This gives person 1 enough time to properly response to a former prompt (e. g. to clear the camera view on seatbelt 4 as outputted in activity 11) until the method repeats the determination whether the seatbelt is correctly fastened (activity 12). In a similar way, the method waits 3 seconds until person 2 sitting on the back seat has cleared the camera view on the shoulder belt of seatbelt 5 by removing his right hand. In some embodiments, the defined threshold of time may comprise different time periods for persons sitting on different seats, such as e. g. 3 seconds for persons 1 and 3 sitting on the front seats of the vehicle and 5 seconds for person 2 sitting on the back seat. This may take into account that the viewing conditions for the camera on the seatbelts for the front seats are less constrained that those for the seatbelts for the back seats, which may be partially occluded by the front seats and the occupants of the front seats. It therefore may take less time to determine whether camera/sensor fields of view for the front seat seatbelts 4 and 6 are cleared than for the seatbelts for the back seats, such as seatbelt 5.

The occlusion of seatbelt 3, 4, 5 and/or 6 may also occur by an object, which e. g. one of the persons 1, 2, and/or 3 has placed in the camera field of view, such as a drinking cup, a mobile phone, a jacket, a handbag etc. Removing this object of the camera field and therefore clearing the field of view may also require some time, e. g. when the person first has to think about where to alternatively place a drinking cup in the cabin of the vehicle. A defined threshold of time may be therefore also applied in these situations. These time thresholds may be different from the corresponding threshold applied for removing body parts. E. g. a longer time period may be used, such as 10 seconds, giving the person enough time for an alternatively placing of an object inside the vehicle cabin before outputting the prompt in activity 11.

In some embodiments, and also shown in FIG. 4, the method may further comprise determining 25, 27, before outputting the prompt and based on the interior cabin data, whether the person 1, 2 or 3 is, within a defined threshold of time, seated correctly and/or the shoulder belt and/or the lap belt is positioned correctly. Relating to the interior cabin data and the defined threshold of time, it is referred to the corresponding paragraphs of this disclosure. The thresholds of time for the determination 20 whether the person is seated correctly may comprise different time periods than the defined thresholds of time for determining 22 whether the shoulder belt and/or the lap belt is positioned correctly. As an example, the time period provided for the correction of the seating position may be shorter than the time period provided for the correction of the lap belt, such as the mispositioned lap belt of seatbelt 2 in FIG. 1, and/or the shoulder belt, since the correction of a seating position is usually easier and less time consuming than the correction of a part of a seatbelt. This put the determination whether a seatbelt, such as seatbelts 4, 5, and 6 is correctly fastened on a sounder basis, since additional aspects as the seating position and the individual position of essential seatbelts parts are taken into account for the determination in activity 12.

In some embodiment, the time periods of activities 25, 26, and 27 may be individually configurable, e. g. by a vehicle fleet operator, in order to meet specific operational, safety-relate or legally-required constraints.

In an embodiment as also depicted in FIG. 3, the method comprises that re-determining 12 whether the seatbelt 4, 5, or 6 is correctly fastened comprises determining 23 whether the person 1, 2, or 3 has positioned a hand near the seatbelt. A hand of the person positioned at or near the seatbelt serves as indication that the person, in response to having received a corresponding prompt (activity 11), has made some corrections on the seatbelt positions or has cleared the camera field-of-view on the seatbelt. In a repetition of activity 12, it is then once more determined whether the seatbelt is correctly fastened. Without executing activity 23, a repetition of activity 12 may be executed without any possible prior corrections by the person on the seatbelt, causing an (unnecessary) repetition of activity 12 on a possible not corrected seatbelt, resulting in an almost inevitable determination that the seatbelt is still not correctly fastened. A new determination cycle as shown in FIG. 2 has then to be started. Referring again to FIG. 1, it can be identified in the camera field-of-view, that person 3 has positioned his right hand on the fastener of seatbelt 3. In some embodiments, activity 23 may also be executed based on data generated by a touch-sensor installed at the seatbelt fastener. This indicates a possible correction on the position of seatbelt 3, such as to position the lap belt above the body of person 3 and thereby removing the lap belt from its current position, in which person 3 is sitting on it. Once the position of the lap belt is changed, activity 12 is repeated and it is once more determined whether seatbelt 6 is correctly fastened. If the determination 23 yields that the person has his hand positioned neat the seatbelt, the sequence returns to activity 9, as indicated by the encircled letter A.

In some embodiments the activities 20, 21, 22, and 23 may be carried out sequentially in the order either indicated in FIG. 3 or any other sequential order not shown in FIG. 3. In some further embodiments, some or all of the activities 20, 21, 22 and 23 may be executed partially or entirely in parallel. In some embodiments, the activities as depicted in FIGS. 3 and 4 may be comprised by the determining activity 8 of FIG. 2.

Figure 5:
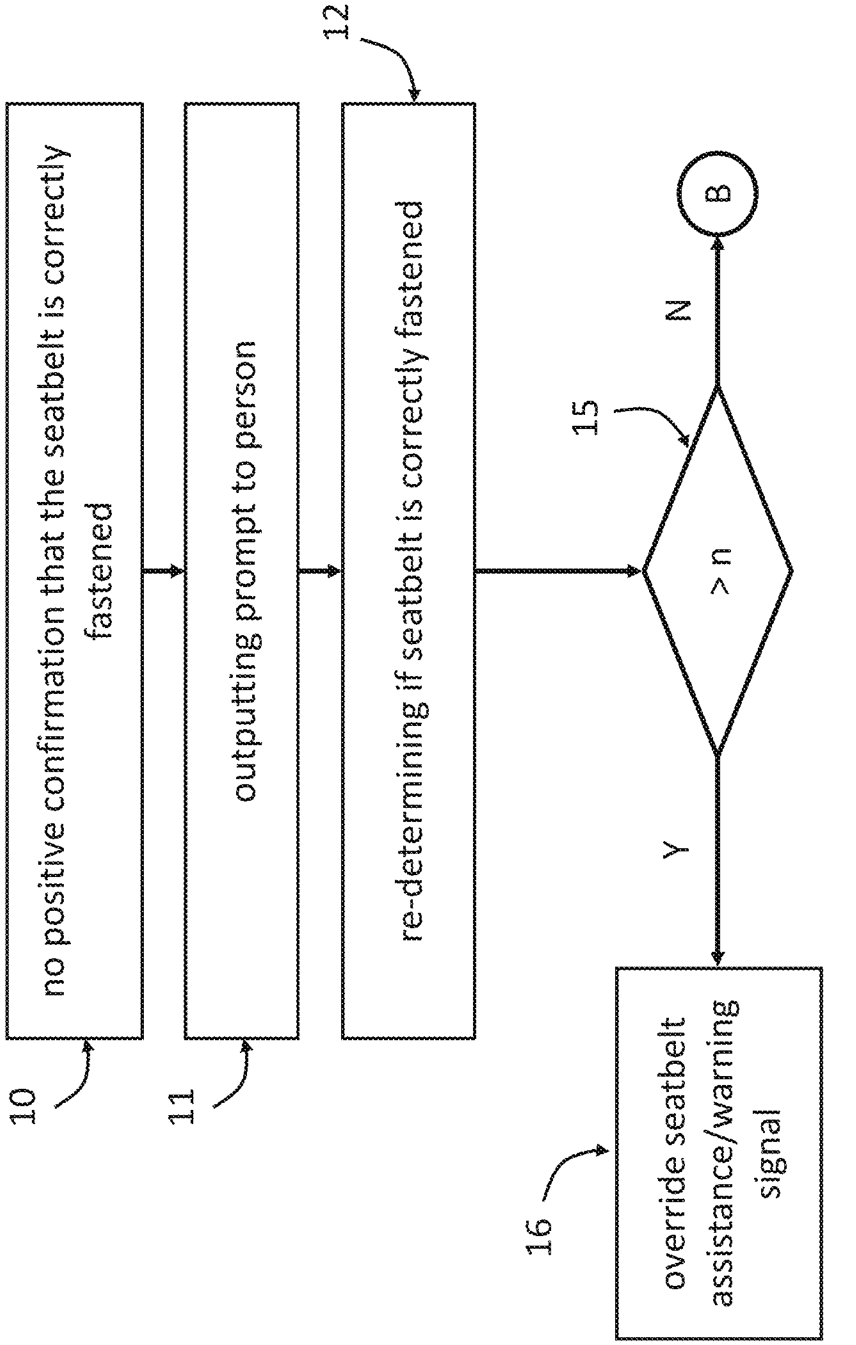
FIG. 5 shows a second computer-implemented sequence for seatbelt assistance as disclosed herein.

In embodiments shown in FIG. 5, wherein the re-determining 12 does still not provide the positive confirmation that the seatbelt is correctly fastened, the method further comprises repeating outputting 10 the prompt and re-determining 12 for a preset number of times. In continued absence of the positive confirmation 10 for a preset number of times 15, such as e. g. n times, that the seatbelt is not correctly fastened, at least one of an overriding signal, enabling the person to override seatbelt assistance, and a warning signal indicating that at least one seatbelt is not correctly fastened, is outputted 16. Referring again to the example as shown in FIG. 1, if it is re-determined 12 e. g. five times that one or more of the seatbelts 4, 5, and 6 are (again and again) not correctly fastened, the person 1, 2, or 3 is enabled to override seatbelt assistance and may have further to determine on their own and without any further assistance from the vehicle whether their seatbelts are correctly fastened. This prevents that the persons are caught in an endless loop and enables that the determination whether the seatbelts are correctly fastened can be done the "traditional" way by human inspection. The persons therefore have the possibility to avoid a new repetition of the method and therefore to avoid being subjected to a high-number repetition or being deadlocked in an endless repetition of the method. This may be helpful in the case depicted e. g. in FIG. 1, where more than one, such as three persons (person 1, 2 and 3) are checked whether the corresponding seatbelt is correctly fastened. If the confirmation fails e. g. three times for person 2 on the back seat, the method can be overridden and the vehicle nevertheless be started. If the determination 15 yields that the continued absence of the positive confirmation occurs e.g. less than n times, the method continues as shown in FIGS. 3 and 4. As in the case for FIG. 2, the encircled letter B denotes the connecting points to the sequences shown in FIGS. 3 and 4.

The methods as described herein may be, in some embodiments, part of a personal welcome assistance system, which may be applied e. g. in an autonomous vehicle, which may not be activated until a correct seatbelt fastening is confirmed for all persons/occupants in the autonomous vehicle. The methods may also be executed during vehicle driving, but with different configuration parameters, e. g. that the seatbelt has not been seen for some time or that the seatbelt is not fastened any more.

Figure 6:
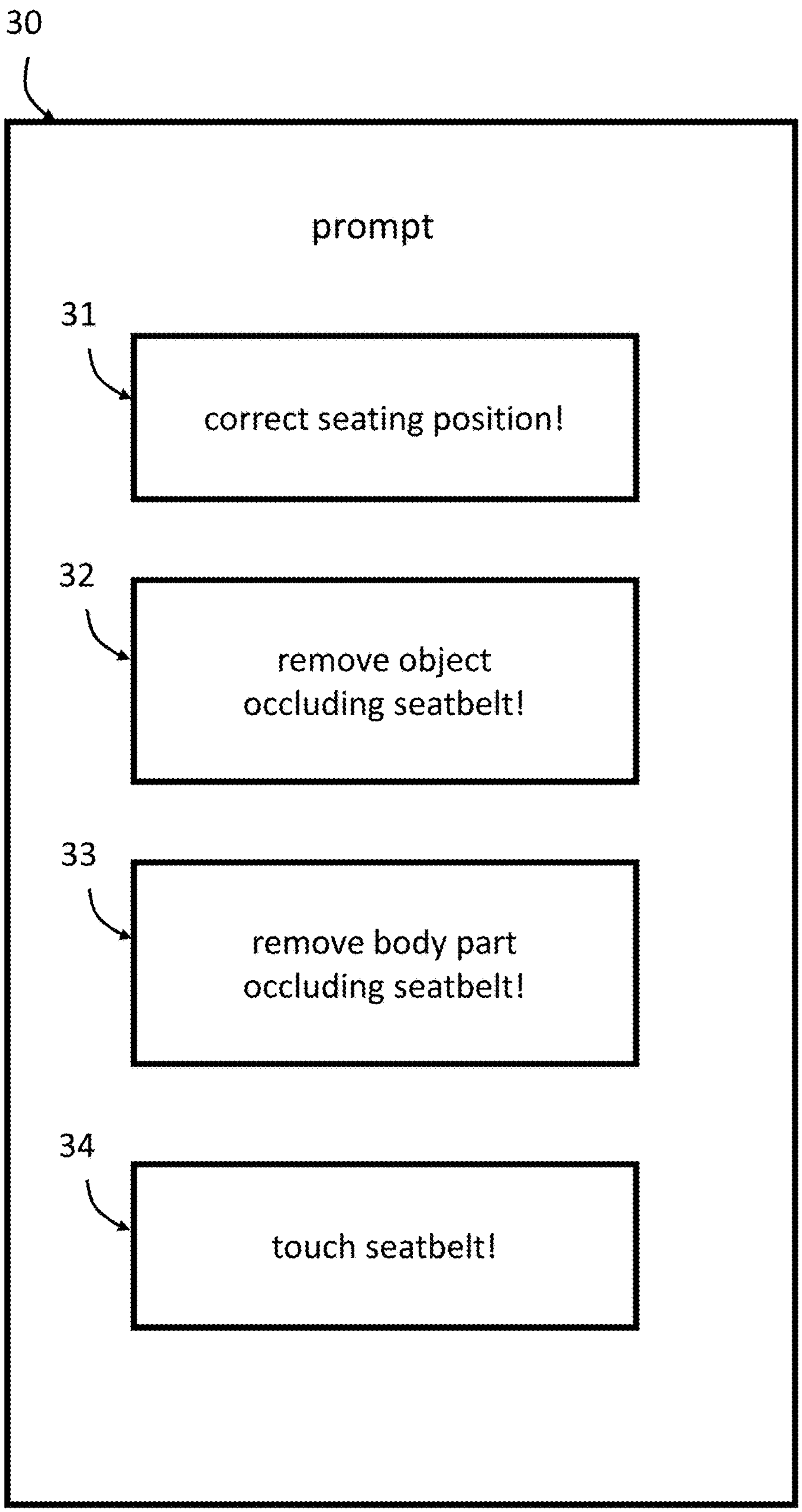
FIG. 6 illustrates a prompt as disclosed herein.
Figure 7:
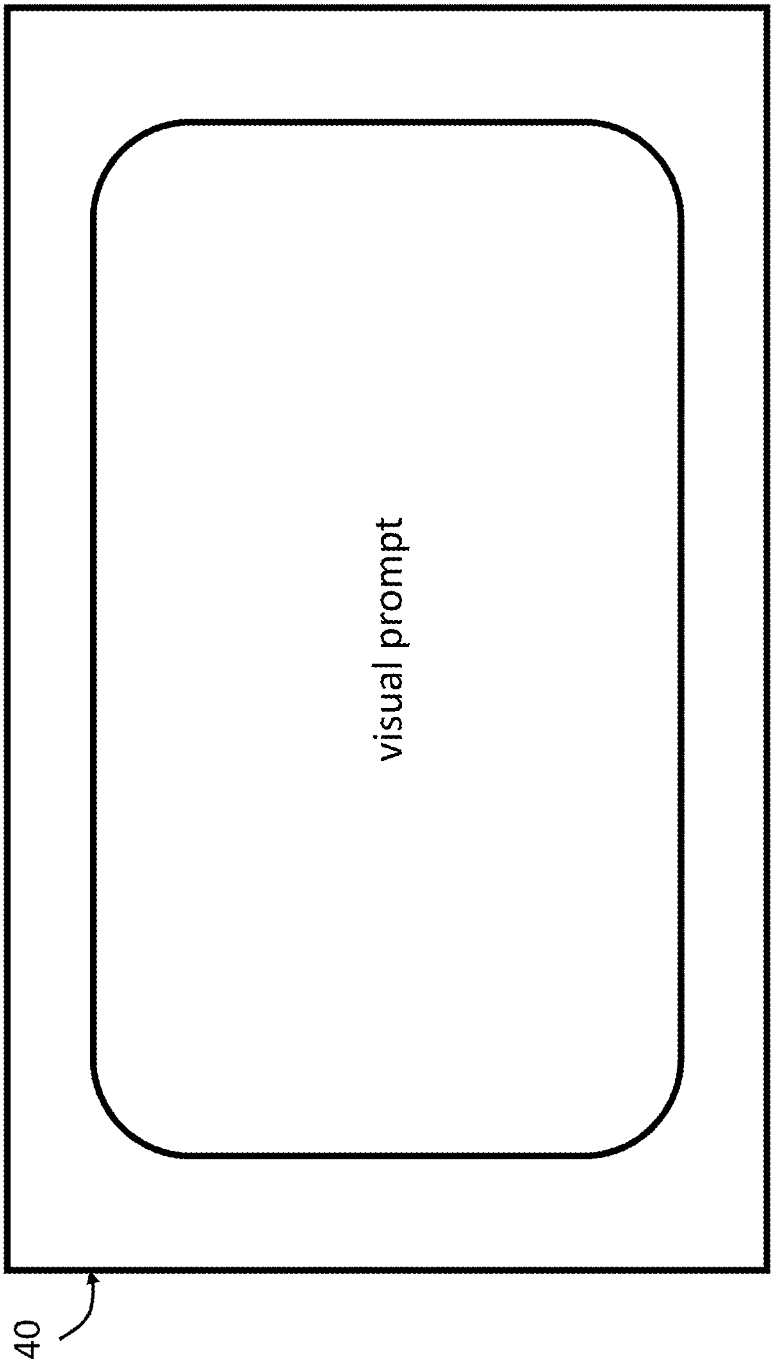
FIG. 7 schematically illustrates an interface for outputting a visual output signal.
Figure 8:
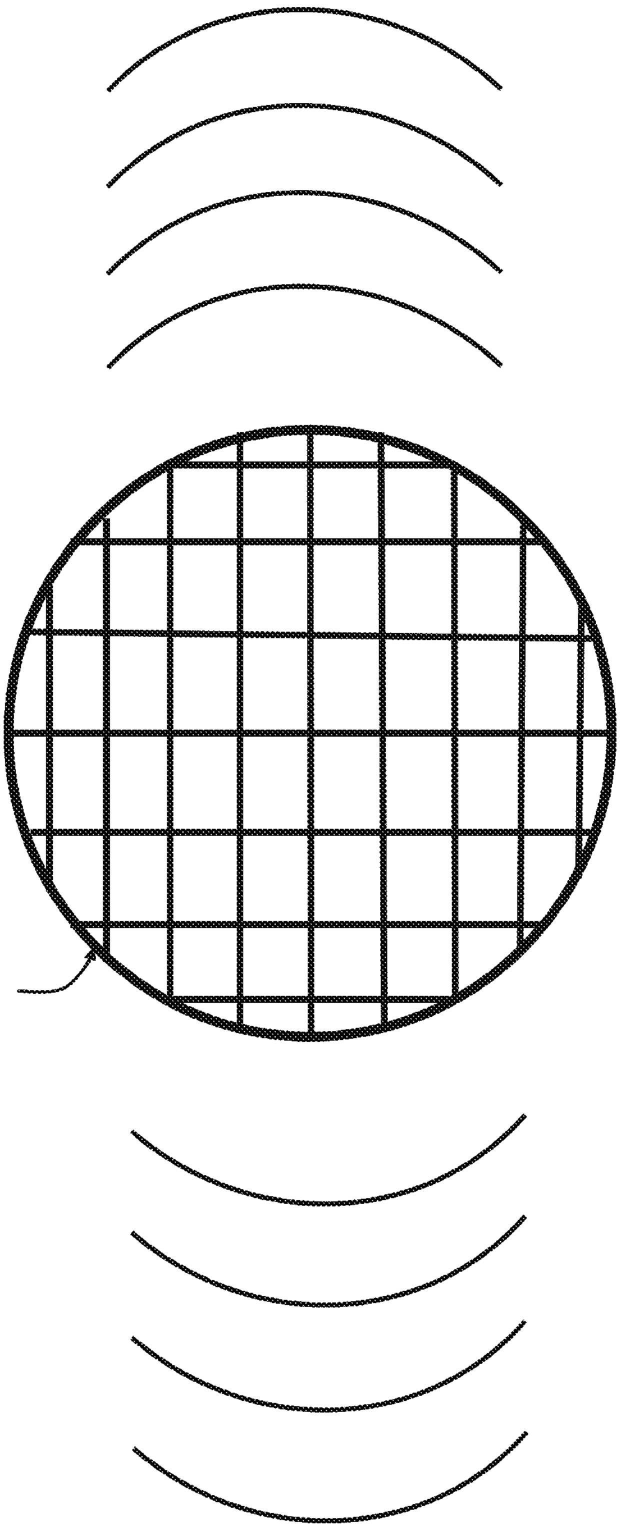
FIG. 8 schematically illustrates an interface for outputting an audio output signal.

In some embodiments as depicted in FIG. 6, the prompt 30 comprises a prompt to the person to correct a seating position 31 and/or to remove an object and/or a body part occluding the seatbelt 32, 33 and/or to touch the seatbelt 34 and/or wherein the prompt comprises visual and/or audio output signals. In some embodiments shown in FIG. 7, the visual output signals may be outputted on a screen 40 being an interface for outputting a visual output signal, which may be installed at or near the dashboard in the vehicle cabin. The output screen 40 may also be installed at other points in the vehicle cabin, such as the ceiling of the cabin or at the back side of the front seats (driver seat and/or passenger seat). In some embodiments, there may be more than one output screens 40 installed in the cabin, such as at the dashboard and at the back side of the front seats. The visual output signals may comprise text messages displayed on the one or more of the screens 40. The text messages may comprise messages such as "correct your seating position" or "remove your arm from the seatbelt" etc. In some embodiments, the visual signals may be displayed as symbols on the screens 4, whereby a distinct symbol may be used for each of the prompts 31, 32, 33 and 34. In further embodiments, the visual signals may also be displayed on interfaces such as a head-up display or light emitting diodes (LEDs), bulbs etc. In some embodiments as illustrated in FIG. 8, the audio output signals comprised by the prompt may be outputted by a loudspeaker system 41 being an interface for outputting an audio output signal, which may be installed at one or more points inside the vehicle cabin. The audio output signals may comprise text messages such as "person on driver seat-correct your seating position" or "person on back seat-remove your arm from seatbelt" etc. In some embodiments, a combination of visual and audio output signals is comprised. The visual and audio output signals provide understandable and recognizable information to the persons about the fastening status of their seatbelts.

Figure 9:
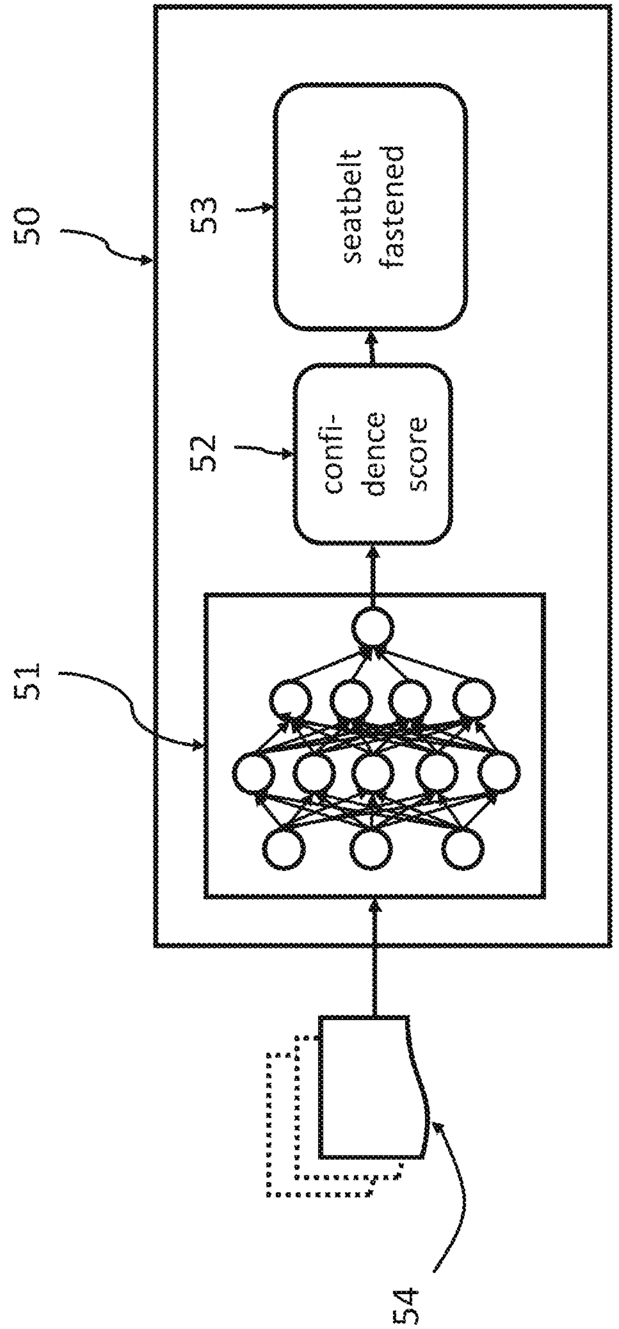
FIG. 9 shows an implementation example of a system for determining whether a seatbelt is correctly fastened.

In some embodiments as illustrated in FIG. 9, determining 8 and re-determining 12 whether the seatbelt is correctly fastened utilizes one or more machine-learning models. In some further embodiments, the machine learning based methods comprise neural networks and/or supervised learning and/or unsupervised learning and/or reinforcement learning and/or decision trees. FIG. 9 presents an implementation example of a system for determination whether a seatbelt is correctly fastened. In this example, the system comprises a seatbelt fastening classifier 51 being a neural network with a first input channel configured to receive one (or more) current image(s) 54 from e. g. the camera/sensor system in the cabin of the vehicle. In this example, the seatbelt fastening classifier 51 is trained to output a confidence score 52, e.g., a number between 0 and 100 relating to the confidence that a correctly fastened seatbelt is shown in the current image 54. The seatbelt fastening classifier 41 may then also output the classification, i.e., whether the seatbelt is correctly fastened or not, based on and along with the confidence score for this classification. This reduces the likelihood of an incorrect determination that a seatbelt is correctly fastened or not fastened based on the detected position of the seatbelt, such as the shoulder belt and the lap belt on the person, since e. g. corresponding data of earlier correct of a seatbelt fastening state also form the basis of the determination, thereby strengthening the reliability of the system.

Figure 10:
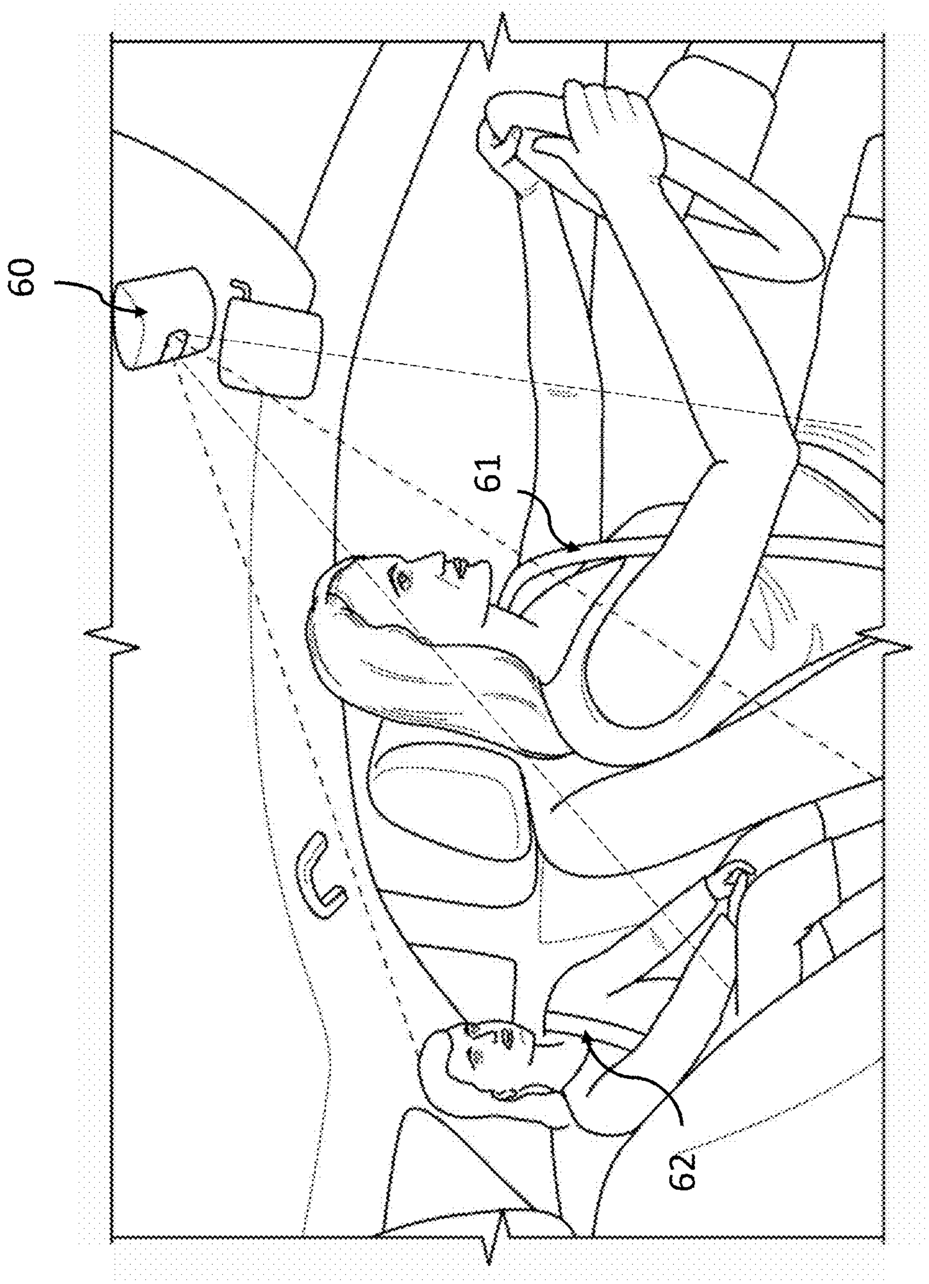
FIG. 10 example depicts a vehicle cabin interior camera system.

In some embodiments as illustrated in FIG. 10, the interior cabin data is generated by a vehicle sensor system which comprises a camera system 60 having a camera field of view of the seatbelt, such as seatbelt 61 of the driver seat and seatbelt 62 of the backseat. In some embodiments, more than one camera may be installed in the cabin, with each camera having different seatbelts within their fields off view. As an example, a first camera may have the seatbelts of the front seats of the vehicle (driver seat and passenger seat) in its field of view and a second camera may have the seatbelts of the back seats (such as seatbelt 2 of FIG. 1 or seatbelt 62 of FIG. 10) in its field of view. In some embodiments and as already mentioned above, the cameras may comprise cameras for visible light and infrared (IR)-cameras or a combination thereof.

In some embodiments as shown in FIG. 11, the method comprises logging results of determining 8 and re-determining 12 whether the seatbelt is correctly or not correctly fastened, outputted signals and the interior cabin data. The outputted signals comprise at least one of the outputted prompts, the outputted warning and control signals. The logging 70 shown as an example in FIG. 11 indicated a correct seatbelt fastening of seatbelt 61 of the driving person shown in FIG. 10 at the 11 and 12 Dec. 2022 and two unsuccessful attempts to fasten the seatbelt 62 of the young passenger on the backseat on 12 Dec. 2022. Furthermore, and not shown in FIG. 11, additional data such as the outputted signals and the interior cabin data are logged. This enables determining technical statistics such as a success rate of the mechanisms described herein. In addition, the logging of sensor data, such as the image data taken by the cameras enable at a later point to assess the persons activities concerning its seatbelt use in the vehicle in the case the responsibility for a correct seatbelt use is handed over to the driver or a responsible user of the vehicle. In this case the logged sensor data could be used at a later point of time to establish/confirm that the person did not misuse the manual override capability of the system.

Figure 12:
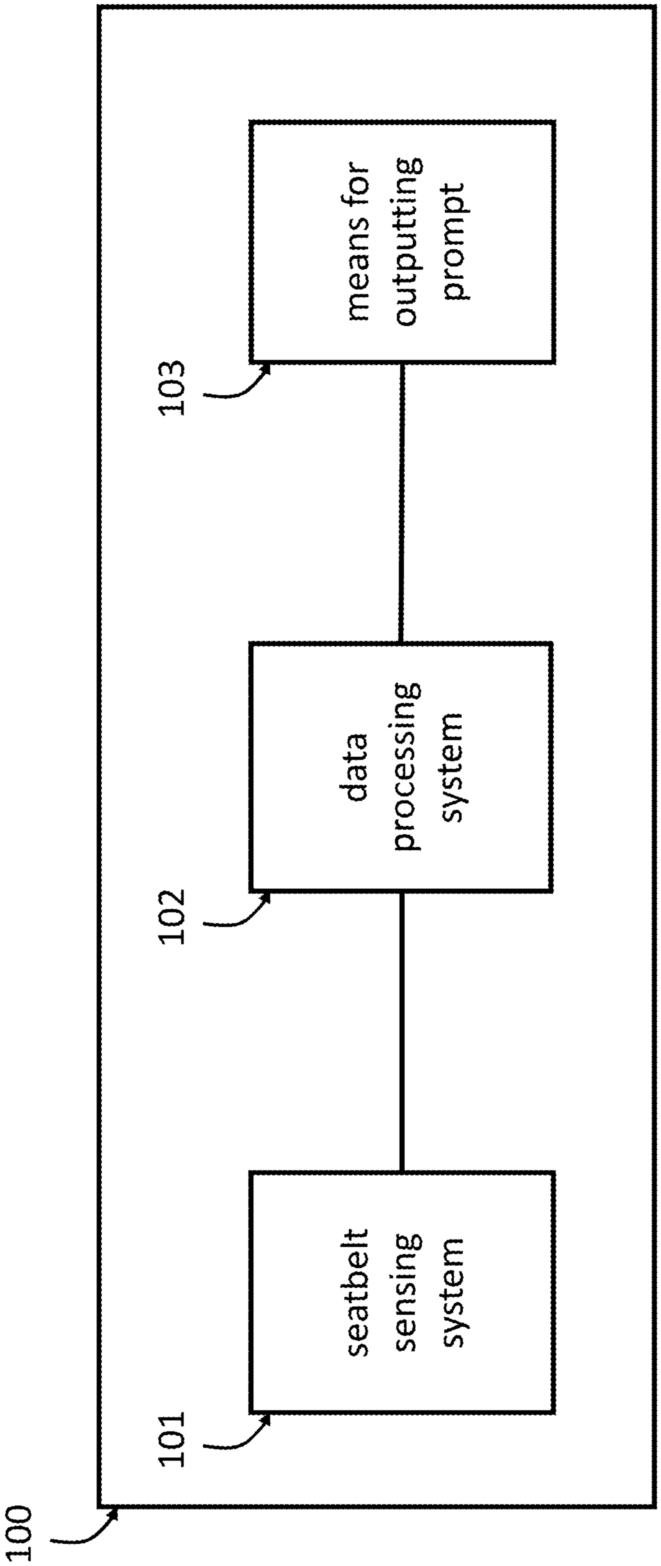
FIG. 12 schematically shows a system for seatbelt assistance.
Figure 13:
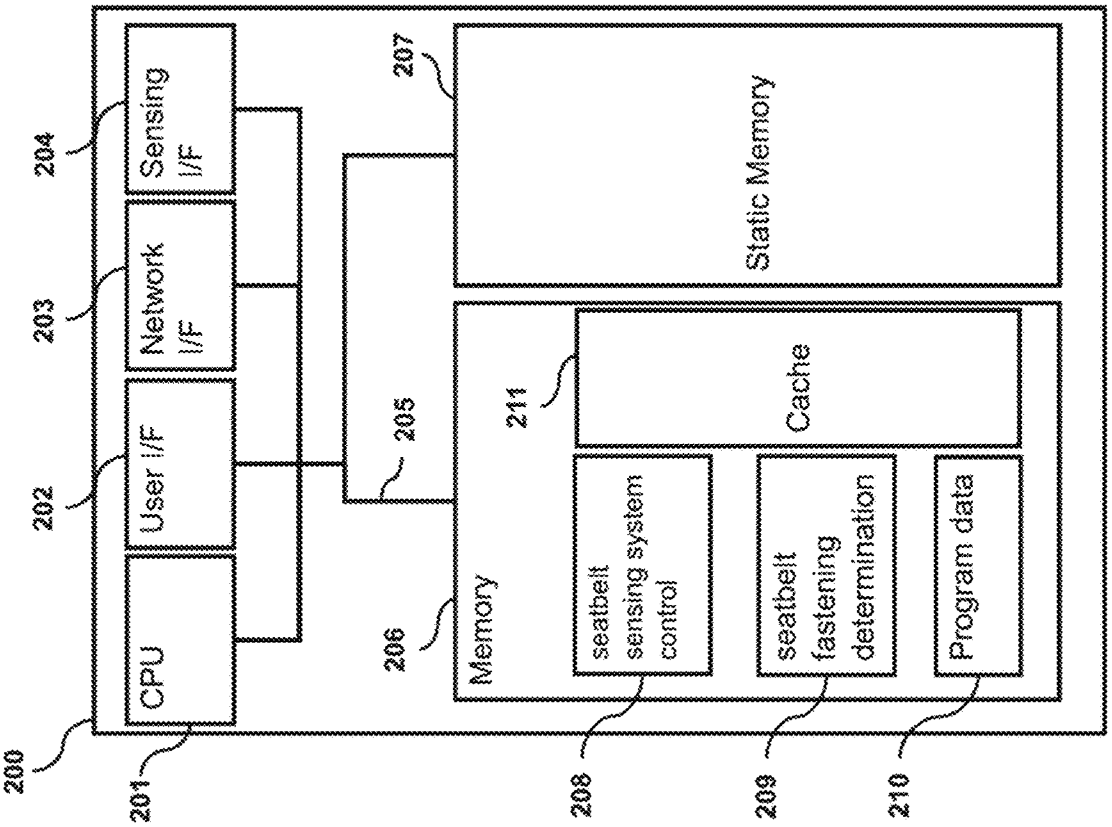
FIG. 13 is a diagrammatic representation of internal components of a data processing system comprises by the system for seatbelt assistance.

According to an aspect, a system 100 for seatbelt assistance is provided, comprising, as shown in FIG. 12, a seatbelt sensing system 101, a data processing system 102 and interfaces for outputting a prompt 103, the system being configured to perform any one of the computer-implemented methods as described in the preceding paragraphs. FIG. 13 is a diagrammatic representation of internal components of a data processing system 200 implementing the functionality as described herein. The data processing system 200 may be located in the vehicle and includes at least one processor 201, a user interface 202, a network interface 203 and a main memory 206, that communicate with each other via a bus 205. Optionally, the data processing system 200 may further include a static memory 207 and a disk-drive unit (not shown) that also communicate with each via the bus 205. A video display, an alpha-numeric input device and a cursor control device may be provided as examples of user interface 202.

Furthermore, the data processing system 200 may also comprise a specified sensing interface 204 to communicate with seatbelt sensing system 101 of the vehicle. Alternatively, the data processing system 200 may communicate with the seatbelt sensing system 101 via the network interface 203. The seatbelt sensing system 101 is used for generating interior cabin data to detect a fastening state of a seatbelt. The data processing system 200 may also be connected to database systems (not shown) via the network interface, wherein the database systems store at least part of the images needed for providing the functionalities described herein.

The main memory 206 may be a random-access memory (RAM) and/or any further volatile memory. The main memory 206 may store program code for the seatbelt sensing system control 208 and the determination of a correct seatbelt fastening 209. The memory 206 may also store additional program data required for providing the functionalities described herein. Part of the program data 210, the determination of a correct seatbelt fastening 209 and/or the seatbelt sensing system control 208 may also be stored in a separate, e.g., cloud memory and executed at least in part remotely. In such a various embodiment, the memory 206 may store the seatbelt states according to the methods describes herein in a cache 211.

Figure 14:
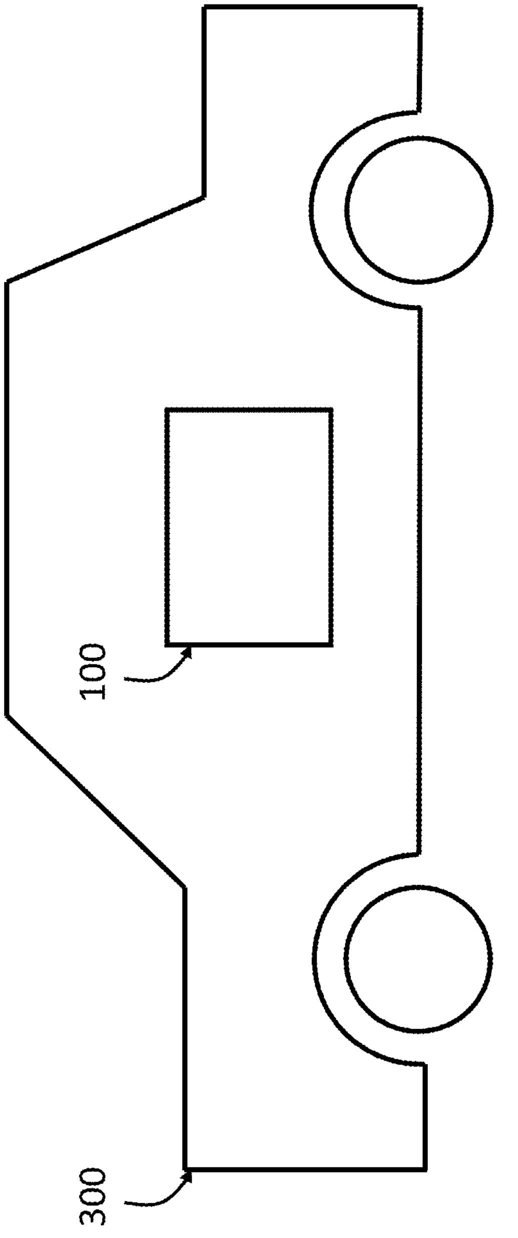
FIG. 14 schematically shows a vehicle comprising a system for seatbelt assistance.

According to an aspect, as shown in FIG. 14, a vehicle 300 is provided comprising the system 100 as described in the preceding paragraphs executing any one of the methods as described within the present disclosure. Within the present disclosure, the term "vehicle" includes all type of vehicles, where a person can manually open a door, such as a car, an autonomous car, a streetcar, a railway-car etc.

According to an aspect, a computer program comprising instructions is provided. These instructions, when the program is executed by a computer, cause the computer to carry out the methods described herein. The program code embodied in any of the systems described herein is capable of being individually or collectively distributed as a program product in a variety of different forms. In particular, the program code may be distributed using a computer readable storage medium having computer readable program instructions thereon for causing a processor to carry out aspects of the embodiments described herein.

Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

It should be appreciated that while particular embodiments and variations have been described herein, further modifications and alternatives will be apparent to persons skilled in the relevant arts. In particular, the examples are offered by way of illustrating the principles, and to provide a number of specific methods and arrangements for putting those principles into effect.

In certain embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the disclosure. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "include", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, the described embodiments should be understood as being provided by way of example, for the purpose of teaching the general features and principles, but should not be understood as limiting the scope, which is as defined in the appended claims.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A computer-implemented method for seatbelt assistance in a vehicle, the method comprising:
- determining, based on interior cabin data, a status of a seatbelt associated with a person, wherein:
  - the status of the seatbelt indicates whether a seatbelt is correctly fastened, and
  - the interior cabin data includes image data from one or more cabin-facing camera sensors, and
- in response to the status of the seatbelt not indicating that the seatbelt is correctly fastened:
  - outputting a prompt to the person, wherein the prompt is configured to cause the person to take action to correct the status of the seatbelt, and
  - re-determining, based on updated interior cabin data that includes an indication of a reaction to the prompt, the status of the seatbelt, wherein re-determining the status of the seatbelt includes determining, based on data generated by a touch sensor installed at a fastener of the seatbelt, whether a hand of the person is positioned near the seatbelt.

2. The method of claim 1 wherein:
- determining the status of the seatbelt includes determining, based on the interior cabin data, whether the seatbelt is occluded by at least one of an object or a body part of the person, and
- the prompt includes prompting the person to clear a sensor field of view on the seatbelt.

3. The method of claim 1 wherein:
- determining the status of the seatbelt includes determining, based on the interior cabin data, whether one or more portions of the seatbelt has an incorrect positioning, and
- the prompt includes prompting the person to correct the seatbelt positioning.

4. The method of claim 2 further comprising determining, before outputting the prompt and based on the interior cabin data, whether the person has, within a defined threshold of time, at least one of:
- corrected a seating position,
- cleared the sensor field of view, or
- positioned the seatbelt correctly.

5. The method of claim 1 further comprising, in response to a determination that the updated interior cabin data does not indicate that the seatbelt is correctly fastened:
- re-outputting the prompt and re-determining the status of the seatbelt for a preset number of iterations; and
- in continued absence of the status of the seatbelt indicating that the seatbelt is correctly fastened, outputting at least one of:
  - an overriding signal, enabling the person to override seatbelt assistance, or
  - a warning signal indicating that at least one seatbelt is not correctly fastened.

6. The method of claim 1 further comprising, in response to re-determining providing a positive confirmation that the seatbelt is correctly fastened, outputting a control signal to a vehicle assistance system.

7. The method of claim 1 wherein the prompt includes at least one of a visual or audio output signal.

8. The method of claim 1 wherein determining and re-determining the status of the seatbelt is performed using one or more machine-learning models.

9. The method of claim 1 further comprising logging at least one of:
- results of determining and re-determining the status of the seatbelt,
- outputted signals, or
- the interior cabin data.

10. A system for seatbelt assistance in a vehicle, the system comprising:
- a data processing system; and
- interfaces for outputting a prompt; and a sensor system configured to:
  - determine, based on interior cabin data, a status of a seatbelt associated with a person, wherein:
    - the status of the seatbelt indicates whether the seatbelt is correctly fastened, and
    - the interior cabin data includes image data from one or more cabin-facing camera sensors, and
  - in response to the status of the seatbelt not indicating that the seatbelt is correctly fastened:
    - output a prompt to the person, wherein the prompt is configured to cause the person to take action to correct the status of the seatbelt, and
    - redetermine, based on updated interior cabin data that includes an indication of a reaction to the prompt associated with the person, the status of the seatbelt, wherein re-determining the status of the seatbelt includes determining, based on data generated by a touch sensor installed at a fastener of the seatbelt, whether a hand of the person is positioned near the seatbelt.

11. A vehicle comprising the system of claim 10.

12. A non-transitory computer-readable medium comprising instructions including:

determining, based on interior cabin data, a status of a seatbelt associated with a person, wherein:

the status of the seatbelt indicates whether a seatbelt is correctly fastened, and the interior cabin data includes image data from one or more cabin-facing camera sensors, and in response to the status of the seatbelt not indicating that the seatbelt is correctly fastened:

outputting a prompt to the person, wherein the prompt is configured to cause the person to take action to correct the status of the seatbelt, and re-determining, based on updated interior cabin data that includes an indication of a reaction to the prompt associated with the person, the status of the seatbelt, wherein re-determining the status of the seatbelt includes determining, based on data generated by a touch sensor installed at a fastener of the seatbelt, whether a hand of the person is positioned near the seatbelt.

* * * * *